United States Patent
Hassner et al.

(10) Patent No.: US 7,178,086 B2
(45) Date of Patent: Feb. 13, 2007

(54) DIRECT PARTIAL UPDATE OF CRC/ECC CHECK BYTES

(75) Inventors: Martin Aureliano Hassner, Mountain View, CA (US); Vipul Srivastava, San Jose, CA (US); Nyles Heise, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 469 days.

(21) Appl. No.: 10/666,401

(22) Filed: Sep. 17, 2003

(65) Prior Publication Data

US 2005/0060630 A1    Mar. 17, 2005

(51) Int. Cl.
*H03M 13/00* (2006.01)

(52) U.S. Cl. ................................. 714/758; 714/784

(58) Field of Classification Search ................ 714/752, 714/758, 784
See application file for complete search history.

(56) References Cited

U.S. PATENT DOCUMENTS

| | | | |
|---|---|---|---|
| 5,864,440 A | | 1/1999 | Hashimoto et al. |
| 5,907,660 A | * | 5/1999 | Inoue et al. ................ 386/109 |
| 5,946,328 A | * | 8/1999 | Cox et al. ................... 714/784 |
| 6,079,044 A | | 6/2000 | Cunningham et al. |
| 6,092,231 A | * | 7/2000 | Sze ............................ 714/758 |
| 6,125,469 A | * | 9/2000 | Zook et al. ................. 714/769 |
| 6,662,334 B1 | * | 12/2003 | Stenfort ..................... 714/769 |
| 2003/0147167 A1 | | 8/2003 | Asano et al. |

OTHER PUBLICATIONS

IBM Almaden Research Center, "Signal Processing / Integrated Sector Format-Error-Correction Code", http://www.almaden.ibm.com/sst/storage/sp/ecc.shtml, printed Jun. 23, 2003.

* cited by examiner

*Primary Examiner*—Albert Decady
*Assistant Examiner*—Esaw Abraham
(74) *Attorney, Agent, or Firm*—Townsend and Townsend and Crew LLP

(57) ABSTRACT

Techniques for correcting data bytes on a data storage disk that have been rewritten are provided. A data storage system generates a long block membership (LBM) byte for each sector. The LBM bytes indicates whether the sector is part of a block of sectors. A data storage system can determine whether a failed sector is part of a long block. The data storage system adds the LBM contributions to the CRC and ECC bytes and then attempts to correct the failed sector. If the correction process is successful, the data storage system declares a miscorrection. If the error is not successfully corrected, the data storage system again adds the LBM contributions to the CRC and ECC bytes and then attempts to correct the failed sector. If the correction process is successful, the data correction is accepted if the error pattern and the check byte overlap is greater than a threshold.

20 Claims, 4 Drawing Sheets

DIRECT PARTIAL UPDATE OF CRC/ECC CHECK BYTES

BACKGROUND OF THE INVENTION

The present invention relates to systems and methods for correcting errors on a data storage medium, and more particularly, to systems and methods for direct partial updates of Reed-Solomon CRC/ECC check bytes.

In data storage devices and systems such as, for example, hard disk drives (HDD), the combination of poor write/read conditions and low signal-to-noise ratio (SNR) data detection is likely to cause a mixed error mode of long bursts of errors and random errors in data sectors stored on the disk. Typically, byte-alphabet, Reed-Solomon (RS) codes are used to format the stored sector data bytes into codewords protected by redundant check bytes and used to locate and correct the byte errors in the codewords. Long codewords are more efficient for data protection against long bursts of errors as the redundant check byte overhead is averaged over a long data block. However, in data storage devices, long codewords cannot be used, unless a read-modify-write (RMW) process is used, because a logical unit data sector is 512 bytes long and computer host operating systems assume a 512 byte long sector logical unit. Each RMW process causes a loss of a revolution of the data storage medium. Losing revolutions of the data storage medium lowers input/output (I/O) command throughput. Therefore, frequent usage of the RMW process becomes prohibitive because it lowers I/O command throughput.

Rather than uniformly adding check bytes to short codewords to correct more random errors in the short codewords, U.S. Pat. No. 5,946,328, issued on Aug. 31, 1999, invented by Cox et al., and assigned to International Business Machines Corporation, discloses a method and means for generating check bytes that are not rigidly attached to a short codeword but are shared by several short codewords in an integrated interleaved Reed-Solomon (RS) Error Correction Coding (ECC) format. Interleaving is a commonly used technique by which the bytes in a data sector are split into several byte streams, each of which is encoded separately, and thus constituting a short Reed-Solomon codeword. A reason for interleaving is to split the errors in a sector among several codewords, thus avoiding the need to build in hardware a very complex Reed-Solomon decoder that can correct a very large number of errors. In the presence of random errors, distinct interleaves may be affected differently, to the effect that a sector can fail on-the-fly (OTF) correction due to an excess of a small number of random errors in one interleave. At low SNR's the probability of such sector failures increases due to an uneven distribution of random errors among the interleaves. U.S. Pat. No. 5,946,328 addresses this specific problem of sector failures due to random errors exceeding the OTF correction capability in one interleave by using shared check bytes in an integrated interleaving two-level ECC format.

In U.S. Pat. No. 5,946,328, the method and means for generating shared check bytes for a two-level ECC among a plurality of interleaves is implemented by performing byte-by-byte summation of all interleaves prior to encoding as well as the repeated byte-by-byte summation of all resulting codewords obtained after encoding. This requires that the interleaved data strings be simultaneously available for byte-by-byte summation, as is the case when the combined interleaves constitute a single data sector. Each individual interleave, as well as their sum, are encoded by Reed-Solomon encoders where the interleave sum codeword has more check bytes than each individual interleave codeword. Summation of the codewords produces a summed interleave codeword that is equally protected against random errors as all the other interleave codewords. The summed interleave codeword has less message bytes at the expense of additional potential check bytes to be used in any interleave codeword with an excess of random errors provided that the remaining interleave codewords do not have errors in excess of the OTF ECC capability.

The combination of low SNR detection and poor write/read conditions may result in both random errors as well as long bursts of byte errors ("mixed error mode") becoming more and more likely at high areal densities and low flying heights, which is the trend in HDD industry. The occurrence of such mixed error mode combinations of random as well as burst errors is likely to cause the 512 byte sector interleaved OTF ECC to fail resulting in a more frequent use of a data recovery procedure (DRP) which involves rereads, moving the head, etc. These DRP operations result in the loss of disk revolutions that causes a lower input/output (I/O) throughput. This performance loss is not acceptable in many applications such as audio-visual (AV) data transfer, for example, which will not tolerate frequent interruptions of video data streams. On the other hand, uniform protection of all single sectors against both random as well as burst errors, at the 512 byte logical unit sector format, would result in excessive and unacceptable check byte overheads. Such check byte overheads also increase the soft error rate due to the increase in linear density of the data.

Long block data ECC, such as 4 K byte physical block comprising eight sectors, for example, could be a solution for some applications, but it would require a change in the operating system standard, unless read-modify-write (RMW) is accepted when writing single 512 byte sectors. Present operating systems are all based on a 512 byte long sector logical unit. RMW is required to update the long physical block check bytes. Thus, when a single 512 byte sector is written, the other sectors in the long block need to be read, the long block check bytes need to be recalculated, and the whole long block is then rewritten. Hence, the RMW causes an I/O throughput performance loss that is generally unacceptable for typical HDD operation.

Therefore, it would be desirable to have an ECC format for a data storage device that has a low sector failure rate for the mixed error mode of random error and burst error, that avoids frequent DRP or RMW use, and that also has an acceptable check byte overhead.

BRIEF SUMMARY OF THE INVENTION

The present invention provides techniques for correcting data bytes on a data storage medium. Data bytes are stored in the data storage medium in sectors. Each sector contains well-known cyclic redundancy check (CRC) bytes and error correction coding (ECC) check bytes that are used for detecting and correcting data bytes in that sector. The CRC and ECC bytes are According to the present invention, a data storage system generates a long block membership (LBM) byte for each sector. The LBM byte indicates whether the sector is part of a block of sectors or not. The data storage system of the present invention adds the LBM contributions to the CRC and ECC bytes and then attempts to correct the failed sector. If the correction process is successful, the data storage system declares a miscorrection.

If the correction process is not successful, the data storage system again adds the LBM contributions to the CRC and ECC bytes and then attempts to correct the failed sector. If the second correction process is successful, the data correction is accepted if the error pattern and the check byte overlap is less than a threshold value. If the second correction process is not successful, the data storage system declares a hard error.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1A:
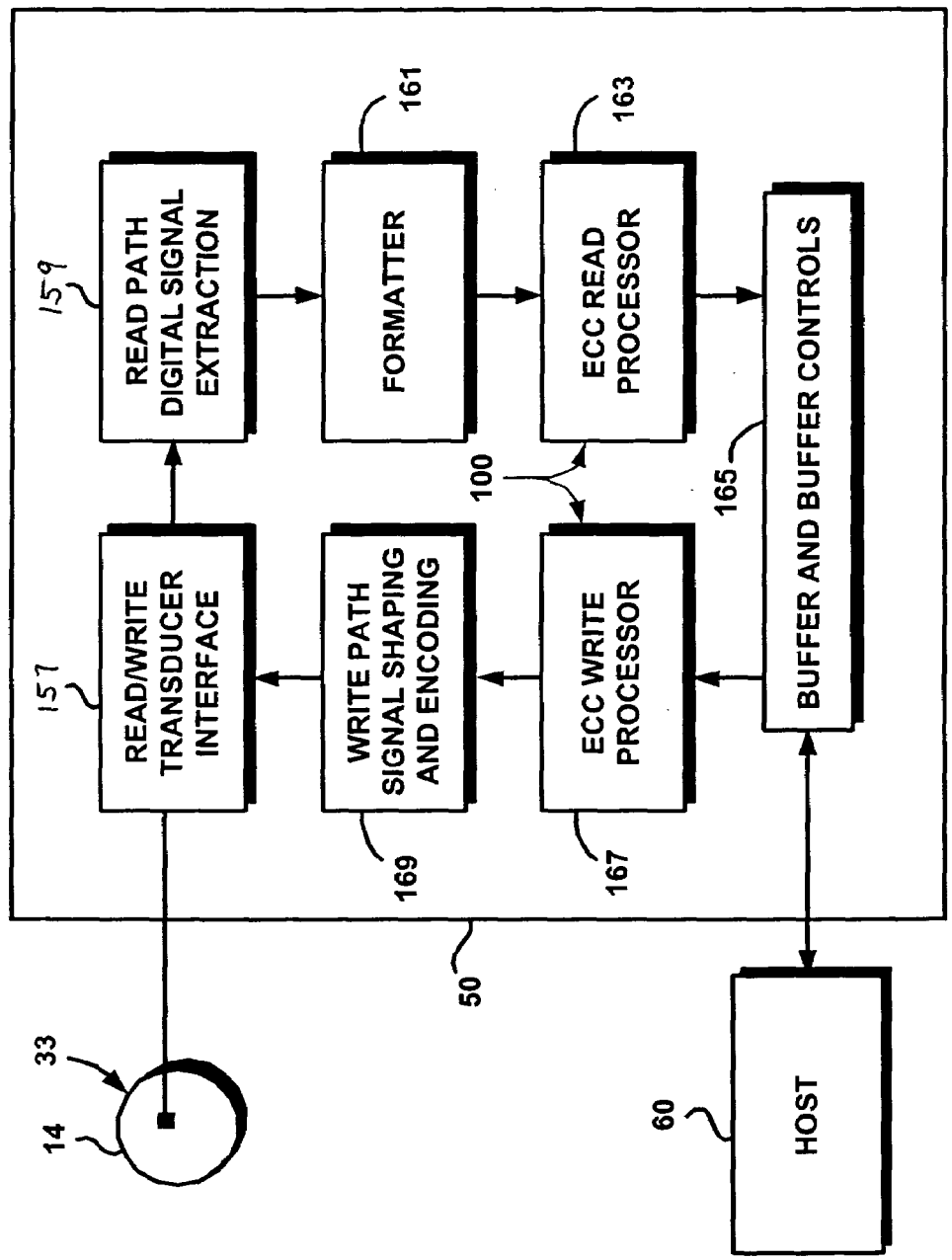
FIG. 1A is a block diagram detailing the architecture of a buffered hard disk drive controller that includes an on-the-fly error correction code (ECC) system for implementing on-the-fly error correction code.
Figure 1B:
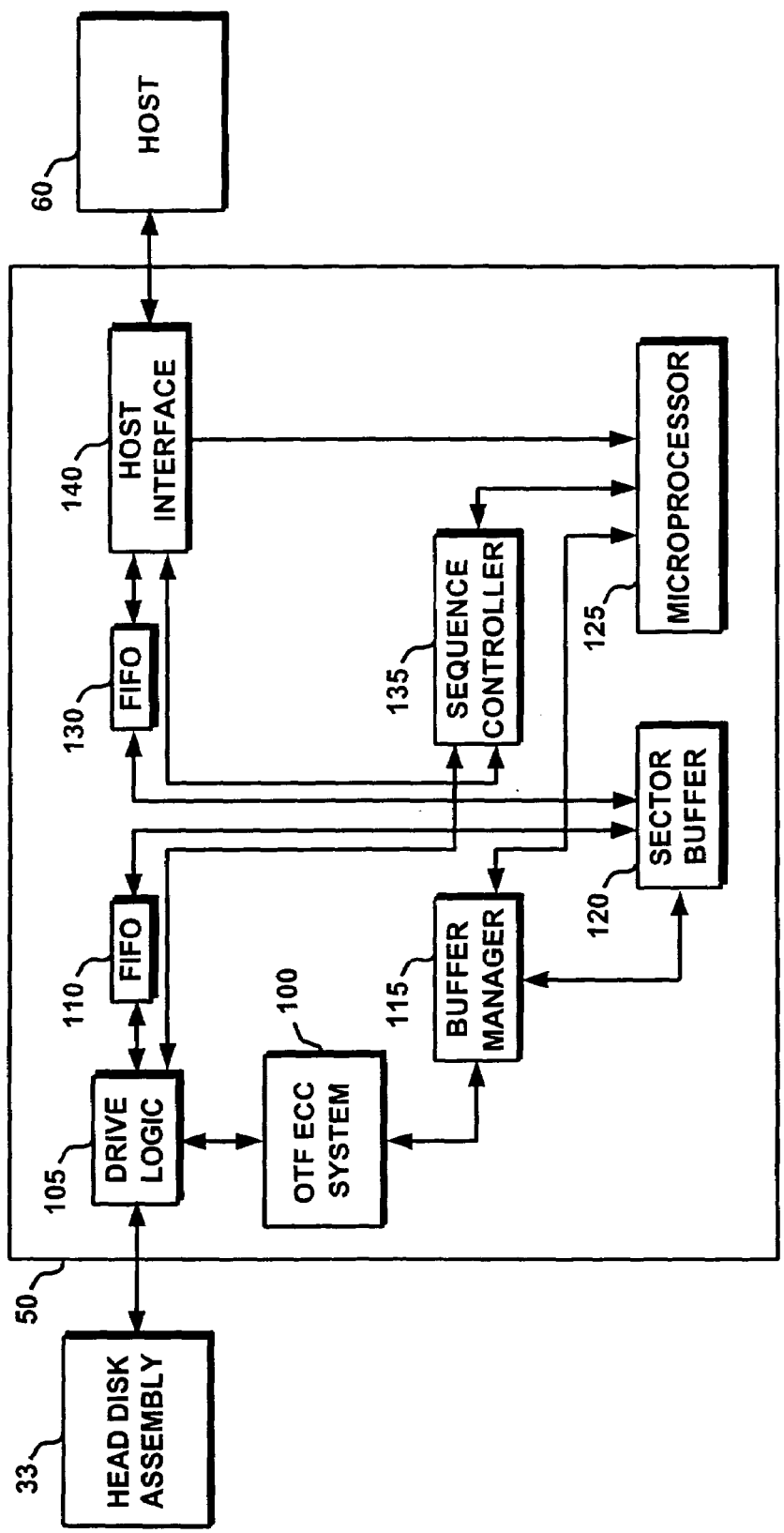
FIG. 1B is a block diagram of a data storage system depicting data flow along a read channel and a write channel of the hard disk drive controller of FIG. 1A.

FIGS. 1A and 1B illustrate an example of a hard disk drive control system for reading and writing data onto a magnetic hard disk. The hard disk drive system of FIGS. 1A–1B detect and correct errors in the data read from a disk. The hard disk drive system of FIGS. 1A–1B can be used to implement the error correction techniques of the present invention, which are discussed in further detail below.

FIG. 1A illustrates an exemplary architecture of a buffered hard disk controller 50. Hard disk controller 50 is configured to read data from and write data to a magnetic hard disk 14. Controller 50 includes an on-the-fly error correction code (ECC) system 100 for implementing an on-the-fly error correction code. On-the-fly error correction code system 100 includes an ECC read processor 163 and an ECC write processor 167.

FIG. 1B is a block diagram of the hard disk controller 50 of FIG. 1A that includes an on-the-fly error correction code system 100. When sequences of digital binary data are to be written onto the disk 14, they are placed temporarily in a buffer 165 shown in FIG. 1A and subsequently processed and transduced along a write path or channel (167, 169, and 157).

The hard drive controller 50 includes a logic drive circuit 105 shown in FIG. 1B that formats data from hard disk assembly 33, for example from 8 bits to 32 bits. A disk assembly 33 is comprised of disk 14 and head stack assemblies. A FIFO register 110 stores the formatted data and exchanges the same with a sector buffer 120. The ECC system 100 receives the formatted data from the drive logic circuit 105 and performs an error correction coding algorithm. ECC system 100 can also perform the techniques and processes of the present invention, which are discussed in detail below.

A buffer manager 115 controls data traffic between the ECC system 100, a sector buffer (i.e., random access memory) 120, and a microprocessor 125. Another FIFO register 130 stores data and exchanges the same with the sector buffer 120. A sequence controller 135 is connected between the drive logic circuit 105, the microprocessor 125, and a host interface 140, to control the sequence operation of the data traffic and various commands across the hard drive controller 50. The host interface 140 provides an interface between the hard drive controller 50 and a host 60.

First, a predetermined number of binary data elements, also termed bytes, in a data string are moved from the buffer 165 and streamed through an ECC write processor 167. In the ECC write processor 167, the data bytes are mapped into codewords drawn from a suitable linear block or cyclic code such as a Reed-Solomon code. Next, each codeword is mapped in a write path signal-shaping unit 169 into a run length limited or other bandpass or spectral-shaping code and changed into a time-varying signal. The time-varying signal is applied through an interface read/write transducer interface 157 and then to the write element in a magneto resistive (or other suitable transducer head) for conversion into magnetic flux patterns.

All of the measures starting from the movement of the binary data elements from buffer 165 until the magnetic flux patterns are written on a selected disk track as the rotating disk 14 passes under the read/write head are synchronous and streamed. For purposes of efficient data transfer, the data is de-staged (written out) or staged (read) a disk sector at a time.

Thus, both the mapping of binary data into Reed-Solomon codewords and the conversion to flux producing time-varying signals must be done well within the time interval defining a unit of recording track length moving under the transducer. Typical units of recording track length are equal fixed-length byte sectors of 512 bytes.

When sequences of magnetic flux patterns are to be read from the disk 14, they are processed in a read path or channel (157, 159, 161, and 163) and written into the buffer 165. The time-varying signals sensed by a transducer are passed through the read/write transducer interface 157 to a digital signal extraction unit 159. Here, the signal is detected and a decision is made as to whether it should be resolved as a binary 1 or 0. As these 1's and 0's stream out of the signal extraction unit 159, they are arranged into codewords in the formatting unit 161.

Because the read path is evaluating sequences of Reed-Solomon codewords previously recorded on the disk 14, absent error or erasure, the codewords should be the same. In order to test whether that is the case, each codeword is applied to an ECC read processor 163 over a path from a formatter 161.

Also, the output from the ECC processor 163 is written into buffer 165. The read path also operates in a synchronous data-streaming manner such that any detected errors must be located and corrected within the codeword well in time for the ECC read processor 163 to receive the next codeword read from the disk track. The buffer 165 and the read and write channels may be monitored and controlled by the microprocessor 125 to ensure efficacy where patterns of referencing may dictate that a path not be taken down, such as sequential read referencing.

As discussed above, data bytes are stored in a data storage disk in sectors. Subsets of the sectors are grouped into long blocks. Each sector contains first level CRC/ECC bytes, and each block includes second level $ECC_B$ bytes.

A data storage system uses the first level sector CRC and ECC bytes to locate and to correct errors in data bytes within a sector. When there are too many errors in the data bytes to be corrected by the first level sector ECC bytes, the data storage system uses the second level block $ECC_B$ bytes to correct the errors. $ECC_B$ bytes are used for correcting data bytes in any of the sectors in that block. Miscorrection of an error can happen when both of the first level and the second level CRC and ECC bytes are in error.

Further details of multiple level, integrated sector format, error correction code, encoding and decoding processes for data storage or communication devices is discussed in further detail in U.S. Patent Application Publication U.S. 2003/0147167 A1, published Aug. 7, 2003, to Asano et al., which is incorporated by reference herein.

A CRC/ECC generator generates the ECC and CRC bytes for a sector based on the data bytes written into that sector. Subsequently, the data storage system can update the data bytes in a sector with new data bytes. The data storage system can write new data bytes into a sector, even if the sector was originally part of a long block of sectors, but the new data bytes are not linked to other sectors in the long block.

When the data bytes are changed in the updated sector, new first level CRC and ECC bytes are also generated and stored in the updated sector so that they can be used to locate and correct the new data bytes. When the original first level CRC and ECC check bytes are erased, the data storage system can no longer determine whether the updated sector is part of a block of sectors. The likelihood of such an event is estimated to be between $10^{-25}$ and $10^{-50}$.

The present invention solves this problem by filtering out sectors that have been updated with new data bytes. The present invention provides a long block membership (LBM) byte for each sector. The LBM byte for a particular sector encodes information that indicates whether that sector was written as a part of a block of sectors or not. The CRC/ECC generator calculates the CRC and ECC bytes for a sector by adding in an incremental contribution from the LBM byte to indicate that the sector is part of a long block.

There are several possibilities for the LBM bytes. The LBM byte can encode the position of the sector within the block, including other information. The hardware can directly calculate the LBM contribution to the CRC/ECC bytes without the need to re-encode the data. Furthermore, both the logic byte address (LBA) and the LBM can change, and this information needs to be updated or checked.

According to the present invention, a failed sector is tested for actual membership within a block of sectors. The second level correction is accepted only in the restricted situation in which taking out the block membership causes the second level decoder to fail. If the second level decoder is successful, a miscorrection is declared. Further details of the present invention are now discussed.

If a sector originally belonged to a block of sectors, the first level CRC and ECC bytes for that sector includes the LBM contribution. When an error in that sector is detected, the LBM contribution is added into the CRC and ECC bytes again, which nulls out the LBM contribution in the CRC/ECC bytes. Because the LBM contribution has been nulled out, the sector no longer belongs to a long block.

The system then attempts to correct the error with the second level $ECC_B$ bytes. If the second level ECC bytes successfully correct the sector error, a miscorrection is declared, because this sector did not belong to a block, and therefore, the second level $ECC_B$ bytes do not accurately correct the error.

If the second level $ECC_B$ bytes fail to correct the error, the system again adds the LBM contributions to the CRC and ECC bytes and attempts a second time to correct the error. If the number of errors in the sector that are undone by putting back the LBM block membership information into the CRC/ECC bytes is above a specified threshold, the system interprets the second level ECC bytes failure to correct the error to be due to previously nulling out the LBM block membership information. This confirms the relevance of the LBM block membership information. The system then trusts the correction, for a specified confidence level, within which the LBM block membership information precisely makes the difference. The threshold is determined by the trust level.

For example, if the threshold level is 5 10-bit symbols, the system reliability is multiplied by $2^{-50}$ which equals $10^{-15}$. The likelihood of the occurrence of such an event, taking it from $10^{-25}$ to $10^{-35}$ or from $10^{-50}$ to $10^{-65}$, whichever assumption one wants to make. The threshold is adjustable.

According to an alternative embodiment of the present invention, the LBM byte is not used to determine whether a sector is a member of a long block of sectors. In this embodiment, the second level $ECC_B$ byte corrections are discarded if they are used to correct more than a specified number of CRC and first level ECC bytes in a sector that has failed the first level correction process. The specified number can be adjusted at any time. This embodiment does not have the certitude of having tested for actual membership within a block of sectors and using only the second level correction in the restricted situations where taking out the block membership causes the second level decoder to fail that the other embodiment provides.

FIG. 1 illustrates the relationship between the bytes associated with a sector 200. Sector 200 includes a logical block address (LBA) byte, and single sector data bytes. The LBA bytes are addresses for the data bytes. The LBA bytes are not written onto the disk.

Sector 200 also includes first level CRC bytes for error detection and first level ECC bytes for error correction. Sector 200 is also associated with a LBM byte. The LBM byte is also not written onto the disk.

Figure 2A:
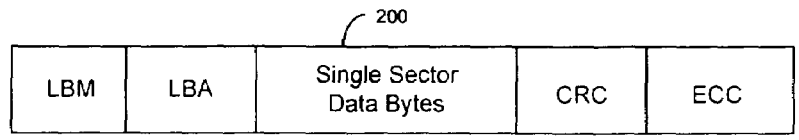
FIG. 2A illustrates a data sector for a data storage disk according to an embodiment of the present invention.
Figure 2B:
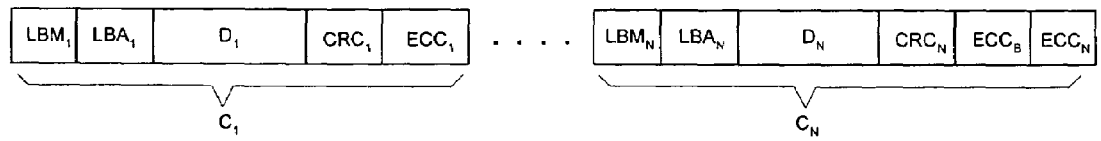
FIG. 2B illustrates a block of data sectors for a data storage disk according to an embodiment of the present invention.

FIG. 2 illustrates bytes associated with a block of sectors. Each block can have any number N of sectors (e.g., 8 sectors). Each sector $C_1-C_N$ is associated with an LBM byte. The last sector in a block includes shared long block error correction code check bytes ($ECC_B$). Shared long block ECC bytes are used to correct errors in data bytes that cannot be corrected by the first level ECC byte in each sector.

The calculation of CRC and ECC bytes are well known algorithms. The systems of FIGS. 3A and 3B modify the well known CRC and ECC calculations to achieve the benefits of the present invention.

Figure 3A:
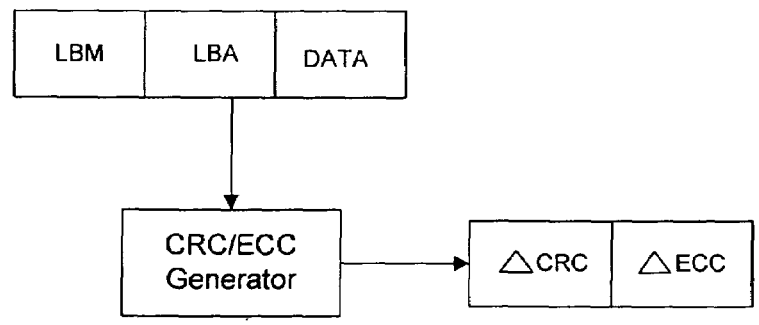
FIGS. 3A and 3B illustrate a process for encoding LBM, LBA, and data bytes to generate CRC and ECC bytes according to an embodiment of the present invention.
Figure 3B:
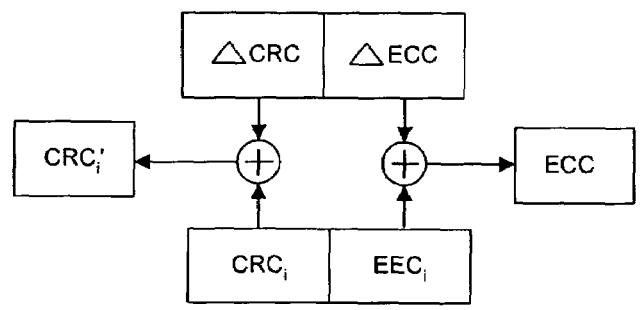

FIG. 3A illustrates how the LBM byte contributes to the CRC and ECC bytes. CRC/ECC generator generates delta CRC and ECC bytes based on contributions from the LBM, LBA, and data bytes. The delta CRC and ECC bytes are added to the CRC and ECC of a sector "i" to generate ECC' and CRC' bytes, as shown in FIG. 3B. The ECC' and CRC' bytes are used in the decoding process as discussed below.

Figure 4:
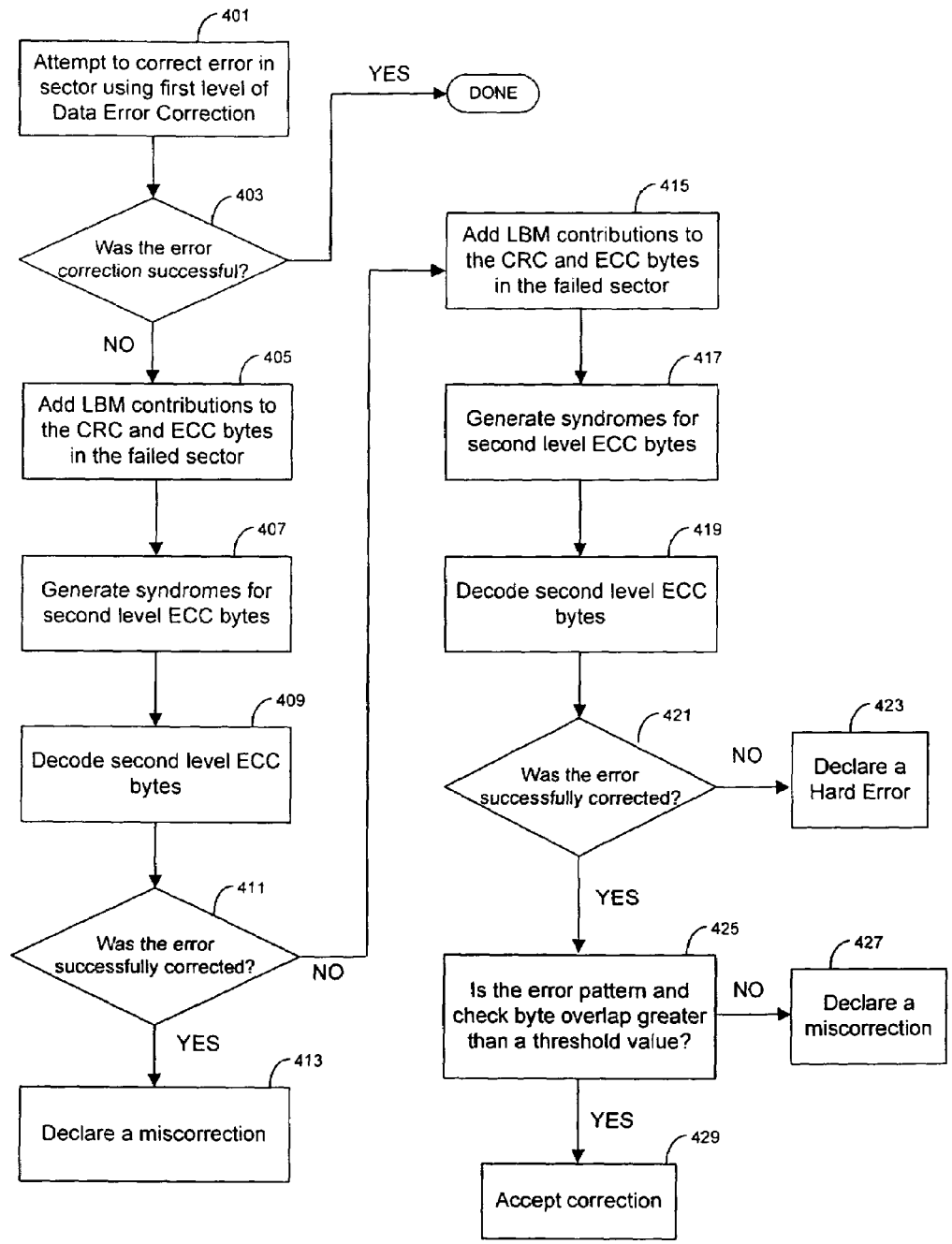
FIG. 4 illustrates a process for correcting errors on a data storage disk according to an embodiment of the present invention.

FIG. 4 illustrates a process according to an embodiment of the present invention. Many or all of the steps shown in FIGS. 3A–B and 4 can be performed by a controller of a magnetic disk drive system such as the controller shown in FIGS. 1A–1B.

Initially, the process of FIG. 4 attempts to correct a data error in a sector using the first level ECC bytes in the failed sector at step 401. A determination is then made as to whether the first level error correction was successful at step 403. If the first level error correction process is successful, the process terminates. If the first level error correction was not successful, the process proceeds to step 405.

At step 405, the data storage system adds the LBM contributions (delta CRC and ECC bytes) to the CRC and ECC bytes for the failed sector as shown in FIG. 3B. The data storage system then generates syndromes for the second level shared block $ECC_B$ bytes at step 407 according to a well-known syndrome generating process. The data storage system then decodes the second level $ECC_B$ bytes at step 409 using a decoding algorithm. The data storage system then makes a determination as to whether the decoding process successfully corrected the error in the sector at step 411.

If the error was successfully corrected, the data storage system declares a miscorrection at step 413. At step 413, the process of FIG. 4 has determined that data bytes in the failed sector are not part of a long block, because adding in the LBM contributions to the sector caused the second level decoder to successfully correct the error. This implies that the sector did not contain the LBM contribution before step 405, and therefore, is not part of a long block. Because the failed sector is not part of a long block, it would not be appropriate to use corrected data generated from the second level $ECC_B$ bytes. Reaching step 413 implies that the failed sector has been updated or overwritten with data bytes that are not part of the original long block.

If the error was not successfully corrected, the data storage system adds the LBM contributions to the CRC and ECC bytes in the failed sector a second time at step 415. Adding the LBM contributions to the failed sector a second time at step 415 cancels out the LBM contributions that were added to the CRC and ECC bytes in the failed sector at step 405.

The data storage system then generates syndromes for the second level shared block $ECC_B$ bytes at step 417 according to a well-known syndrome generating process. The data storage system then decodes the second level $ECC_B$ bytes at step 419 using a decoding algorithm. The data storage system then makes a determination as to whether the error was successfully corrected at step 421. If the error was not successfully corrected, the data storage system declares a hard error at step 423.

If the error was successfully corrected, the data storage system determines whether the error pattern and ECC overlap is greater than a threshold value at step 425. The threshold value sets a minimum trust level with respect to the number of errors that the second level $ECC_B$ check bytes can correct. If the error pattern and ECC overlap is less than or equal to the threshold value, the system declares a miscorrection at step 427, because the trust threshold has not been exceeded. If the error pattern and ECC overlap is greater than the threshold value, the system accepts the corrected values at step 429. The threshold level can be set to any appropriate value.

Thus, the present invention provides techniques for correcting data bytes on a data storage medium. A sector that has been updated or overwritten with new data bytes may not be part of a long block of sectors. The present invention detects whether a failed sector containing an error is part of a long block of sectors. If a failed sector is not part of a long block of sectors, the present invention does not use corrected data generated from the second level $ECC_B$ bytes to correct data in that failed sector. The present invention only uses corrected data generated from the second level $ECC_B$ bytes to correct data in a failed sector that has not been overwritten and is part of an original long block of data sectors.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A controller that corrects erroneous data bytes that are stored in a sector on a disk, wherein:
    the controller performs a first attempt to correct erroneous data bytes that are stored in a failed sector on the disk by decoding first level CRC and ECC bytes,
    if the first attempt to correct the erroneous data bytes is unsuccessful, the controller adds a long block membership (LBM) byte to the first level CRC and ECC bytes, the LBM byte indicating whether the failed sector is part of a long block that includes a plurality of sectors,
    the controller performs a second attempt to correct the erroneous data bytes by decoding second level ECC bytes, and
    if the second attempt to correct the data bytes is unsuccessful, the controller adds the LBM byte to the first level CRC and ECC bytes again and performs a third attempt to correct the erroneous data bytes by decoding the second level ECC bytes to generate corrected data bytes.

2. The controller according to claim 1 wherein the controller determines whether an error pattern in the data bytes and the second level ECC bytes overlap by more than a threshold value.

3. The controller according to claim 2 wherein the controller accepts the corrected data bytes, if the error pattern and the data bytes overlap by more than the threshold value and the third attempt to correct the erroneous data bytes is successful.

4. The controller according to claim 3 wherein the controller declares a hard error if the third attempt to correct the erroneous data bytes is not successful.

5. The controller according to claim 3 wherein the controller declares a miscorrection if the error pattern and the erroneous data bytes overlap by less than the threshold value.

6. The controller according to claim 1 wherein the controller generates syndromes for the second level ECC bytes.

7. The controller according to claim 6 wherein the controller decodes the second level ECC bytes during the second attempt to correct the erroneous data bytes.

8. The controller according to claim 1 wherein the controller declares a miscorrection if the controller successfully corrects the erroneous data bytes during the second attempt.

9. The controller according to claim 1 wherein the controller includes a read/write transducer interface that transmits data signals to a disk assembly.

10. The controller according to claim 1 wherein the controller communicates with a host system.

11. A disk drive system comprising:
a controller that performs a first attempt to correct erroneous data bytes that are stored in a failed sector on a disk by decoding first level CRC and ECC bytes, performs a second attempt to correct the erroneous data bytes by decoding second level ECC bytes if the first attempt is unsuccessful, and performs a third attempt to correct the erroneous data bytes by decoding the second level EGG bytes if the second attempt is unsuccessful,
wherein the controller adds a long block membership (LBM) byte to the first level CRC and EGG bytes if the first attempt is unsuccessful, and the controller adds the LBM byte to the first level CRC and EGG bytes again if the second attempt is unsuccessful,
the LBM byte indicating whether the failed sector is part of a long block that includes a plurality of sectors.

12. The disk drive system according to claim 11 wherein the controller determines whether an error pattern in the data bytes and the second level ECC bytes overlap by more than a threshold value.

13. The disk drive system according to claim 12 wherein the controller accepts the corrected data bytes, if the error pattern and the data bytes overlap by more than the threshold value and the third attempt to correct the erroneous data bytes is successful.

14. The disk drive system according to claim 13 wherein the controller declares a hard error if the third attempt to correct the erroneous data bytes is not successful.

15. The disk drive system according to claim 13 wherein the controller declares a miscorrection if the error pattern and the data bytes overlap by less than the threshold value.

16. The disk drive system according to claim 11 wherein the controller generates syndromes for the second level EGG bytes.

17. The disk drive system according to claim 16 wherein the controller decodes the second level EGG bytes during the second attempt to correct the erroneous data bytes.

18. The disk drive system according to claim 11 wherein the controller declares a miscorrection if the controller successfully corrects the erroneous data bytes during the second attempt.

19. The disk drive system according to claim 11 wherein the controller includes a EGG read processor.

20. The disk drive system according to claim 11 wherein the controller includes a formatter.

* * * * *